(12) United States Patent
Rosenzweig et al.

(10) Patent No.: US 7,532,623 B2
(45) Date of Patent: May 12, 2009

(54) METHODS FOR WIRELESS MESH MULTICASTING

(75) Inventors: Vladimir Rosenzweig, Belmont, MA (US); Cesar A. Santivanez, Boston, MA (US); Joseph J. Weinstein, Somerville, MA (US); Daniel A. Coffin, Sudbury, MA (US)

(73) Assignee: BBN Technologies Corp., Cambridge, MA (US)

( * ) Notice: Subject to any disclaimer, the term of this patent is extended or adjusted under 35 U.S.C. 154(b) by 530 days.

(21) Appl. No.: 11/088,045

(22) Filed: Mar. 23, 2005

(65) Prior Publication Data

US 2005/0232281 A1 Oct. 20, 2005

Related U.S. Application Data

(60) Provisional application No. 60/555,987, filed on Mar. 24, 2004.

(51) Int. Cl.
*H04L 12/28* (2006.01)
*H04L 12/56* (2006.01)

(52) U.S. Cl. .................................. 370/390; 455/445

(58) Field of Classification Search ................. 370/389, 370/390; 455/445
See application file for complete search history.

(56) References Cited

U.S. PATENT DOCUMENTS

| | | | |
|---|---|---|---|
| 5,175,843 A | 12/1992 | Casavant et al. | |
| 5,541,912 A | 7/1996 | Choudhury et al. | |
| 5,649,119 A | 7/1997 | Kondoh et al. | |
| 5,960,047 A | 9/1999 | Proctor, Jr. et al. | |
| 5,974,327 A | 10/1999 | Agrawal et al. | |
| 6,000,011 A | 12/1999 | Freerksen et al. | |
| 6,067,301 A | 5/2000 | Aatresh | |
| 6,094,435 A | 7/2000 | Hoffman et al. | |
| 6,215,765 B1 * | 4/2001 | McAllister et al. | 370/217 |
| 6,272,567 B1 | 8/2001 | Pal et al. | |
| 6,362,821 B1 | 3/2002 | Gibson et al. | |
| 6,714,563 B1 | 3/2004 | Kushi | |
| 6,721,273 B1 | 4/2004 | Lyon | |
| 6,977,895 B1 | 12/2005 | Shi et al. | |
| 7,072,952 B2 | 7/2006 | Takehiro et al. | |
| 7,215,926 B2 * | 5/2007 | Corbett et al. | 455/41.2 |
| 7,353,259 B1 | 4/2008 | Bakke et al. | |
| 2001/0034793 A1 | 10/2001 | Madruga et al. | |
| 2001/0040895 A1 | 11/2001 | Templin | |
| 2003/0022476 A1 | 1/2003 | Hardee | |
| 2003/0153338 A1 | 8/2003 | Herz et al. | |
| 2004/0003111 A1 | 1/2004 | Maeda et al. | |
| 2004/0029553 A1 * | 2/2004 | Cain | 455/403 |
| 2005/0036442 A1 | 2/2005 | Saleh et al. | |

OTHER PUBLICATIONS

CMSC 451, Dave Mount, CMSC 451: Lecture 11. "Articulation Points and Biconnected Components," Tuesday, Oct. 6, 1998. www.cs.umd.edu/~samir/451/bc.ps. pp. 1-5.

(Continued)

*Primary Examiner*—Ronald Abelson
(74) *Attorney, Agent, or Firm*—Ropes & Gray LLP

(57) ABSTRACT

The invention relates generally to systems, methods and/or devices for joining, generating, maintaining, and/or multicasting information via a multicast mesh.

27 Claims, 10 Drawing Sheets

OTHER PUBLICATIONS

Garg, et al, "Improved Approximation Algorithms for Biconnected Subgraphs via Better Lower Bounding Techniques," Department of Computer Science and Engineering, Indian Institute of Technology, New Delhi, pp. 103-111 (1993).

Hsu, et al., "Simpler and Faster Biconnectivity Augmentation," Journal of Algorithms, 45:55-71 (2002).

Jennings, et al., "Topology Control for Efficient Information Dissemination in Ad-hoc Network," Jet Propulsion Laboratory, pp. 1-7. (2002).

Khuller, et al., "Biconnectivity Approximations and Graph Carvings," Journal of the ACM, 41(2):214-235 (1994).

Li, et al., "Sending Messages to Mobile Users in Disconnected Ad-Hoc Wireless Networks," MOBICOM (2000).

Liao, et al., "GRID: A Fully Location-Aware Routing Protocol for Mobile Ad Hoc Networks," Telecommunications Systems, 18(1):37-60 (2001).

Lin, et al., "Adaptive Clusterin for Mobile Wireless Networks," IEEE Journal on Selected Areas in communications, 15(7):1-21 (1997).

McAuley, et al., "Self-Configuring Networks," MOBICOM pp. 315-319 (2000).

Lee, Sung-Ju et al. A Performance Comparison Study of Ad Hoc Wireless Multicast Protocols, 10 pages.

Lee, S. et al. Neighbor Supporting Ad hoc Multicast Routing Protocol, 8 pages.

Karp, B. et al. GPSR: Greedy Perimeter Stateless Routing for Wireless Networks. ACM/IEEE International Conference on Mobile Computing and Networking (MobiCom 2000).

Office Action dated Jun. 11, 2008, U.S. Appl. No. 10/786,335.

Office Action dated Jun. 26, 2008, U.S. Appl. No. 10/913,151.

Lee, Sung-Ju et al. A Performance Comparison Study of Ad Hoc Wireless Multicast Protocols, 10 pages (2000).

Lee, S. et al. Neighbor Supporting Ad hoc Multicast Routing Protocol, 8 pages (2000).

Office Action dated Jan. 22, 2009, U.S. Appl. No. 10/694,968.

Office Action dated Feb. 24, 2009, U.S. Appl. No. 10/786,335.

\* cited by examiner

——————— Radio Link 206
— — — — Mesh Link 208

US 7,532,623 B2

METHODS FOR WIRELESS MESH MULTICASTING

CROSS REFERENCE TO RELATED APPLICATIONS

The instant application claims priority from provisional application number 60/555,987, filed Mar. 24, 2004, the disclosure of which is incorporated herein by reference in its entirety.

STATEMENT REGARDING FEDERALLY SPONSORED RESEARCH OR DEVELOPMENT

This invention was made with Government support under Contract No. DAAB07-02-C-C403, awarded by the U.S. Army. The Government has certain rights in this invention

FIELD OF THE INVENTION

In general, the invention relates to systems, methods, and devices for wirelessly multicasting information traffic. More particularly, the invention relates to wirelessly multicasting information traffic through a mesh.

BACKGROUND

Several protocols for multicasting are known in the prior art. Such protocols can generally be classified as either tree-based multicasting protocols or mesh-based multicasting protocols. Tree-based protocols generate less traffic than mesh-based protocols. However, tree-based protocols typically lack routing redundancy, which can be particularly useful in mobile ad hoc networks in which multicast routes frequently shift due to moving network nodes.

In typical mesh multicasting protocols, nodes are added to a mesh by invitation of a source node. Accordingly, the source node needs to know the location of all nodes in the mesh and the location of nodes that might join the mesh. In addition, typical mesh multicast protocols utilize large meshes, in order to make the mesh available to non-mesh members to join the mesh. These large meshes require additional processing and traffic overhead to maintain.

SUMMARY

The invention relates, in general, to methods for multicasting, particularly in a wireless network. The wireless network includes one or more mobile wireless nodes. The wireless network may also include nodes capable of communicating over multiple channels including wired channels and/or satellite channels.

A node's functionality in the wireless network in relation to multicasting an information packet depends upon the multicast group the packet is intended for and the node that introduced the packet into the wireless network. The combination of a multicast group and an introducing node is referred to herein as a group-source pairing.

A node stores data indicating its functionality with respect to the group-source pairings of which it is aware in a group table. For each group-source pairing, the group table includes, in addition to node functionality, an upstream node list including a list of nodes from which the node expects to receive multicast packets corresponding to the group-source pairing. The group table also includes a downstream node list including nodes to which the node is responsible for forwarding multicast packets corresponding to the group-source pairing. The set of nodes involved in originating, forwarding, and receiving data packets for a particular group-source pairing forms a mesh.

In one aspect of the invention, based on the data a node stores in its group table, the node determines its reaction to receiving a multicast packet with a particular group-source pairing. The node discards packets having a group-source pairing for which the node provides no functionality. The node passes data packets up to its network layer if the node provides a receiving function for the corresponding group-source pairing. The node forwards data packets to other nodes if the node provides a transit function for the corresponding group-source pairing. In one embodiment, a node maintains a list of packet identifiers corresponding to recently transmitted and received data packets. Upon receiving a new packet, the node can compare an identifier in the packet with the list to detect data packets. Duplicate data packets are discarded, thus reducing transmission loops. In another embodiment, multicast forwarding traffic is reduced by layering a multipoint relay protocol on top of the multicasting protocol.

In another aspect of the invention, nodes join a mesh in a receiver-to-source fashion. That is, the process of a node joining a mesh begins with the node requesting to be joined to the mesh. Requests to join a mesh (referred to as "mesh join requests") specify the multicast group the node is requesting to join, as well as a particular source node. If a recipient of a mesh join request is already a member of the mesh, the recipient adds the node to its list of downstream nodes in its group table. If the recipient of the mesh join request is not a member of the mesh and the recipient is closer to the source than the requesting node, the recipient attempts to join the mesh on behalf of the requesting node. Such mesh join requests propagate through the wireless network until a recipient of a mesh join request is able to join the mesh. Once one recipient joins the mesh, the joining node transmits a join acknowledgement message to the preceding requesting node, informing the requesting node that it has been added to the mesh.

In a further aspect of the invention, members of a mesh from time-to-time, or in some embodiments, periodically update their functionality with respect to the mesh. If a node no longer has any downstream nodes to support, and the node is not itself a receiving node in the mesh, the node issues a mesh leave message to inform upstream nodes that it no longer needs to belong to the mesh. If the node lacks sufficient upstream nodes to receive multicast messages through the mesh a predetermined number of times, the node transmits a mesh join request to enlist additional upstream nodes to join the mesh. The predetermined number can be configured based on node density in the mesh and/or on a desired level of redundancy. The more upstream nodes a mesh includes for a given receiving node, the more likely it is that the receiving node will reliably receive multicast packets that it is supposed to receive. As a tradeoff, however, a larger number of upstream nodes leads to an increased amount of traffic through the network.

BRIEF DESCRIPTION OF THE DRAWINGS

The invention may be better understood from the following illustrative description with reference to the following drawings.

DESCRIPTION OF AN ILLUSTRATIVE EMBODIMENT

Figure 1:
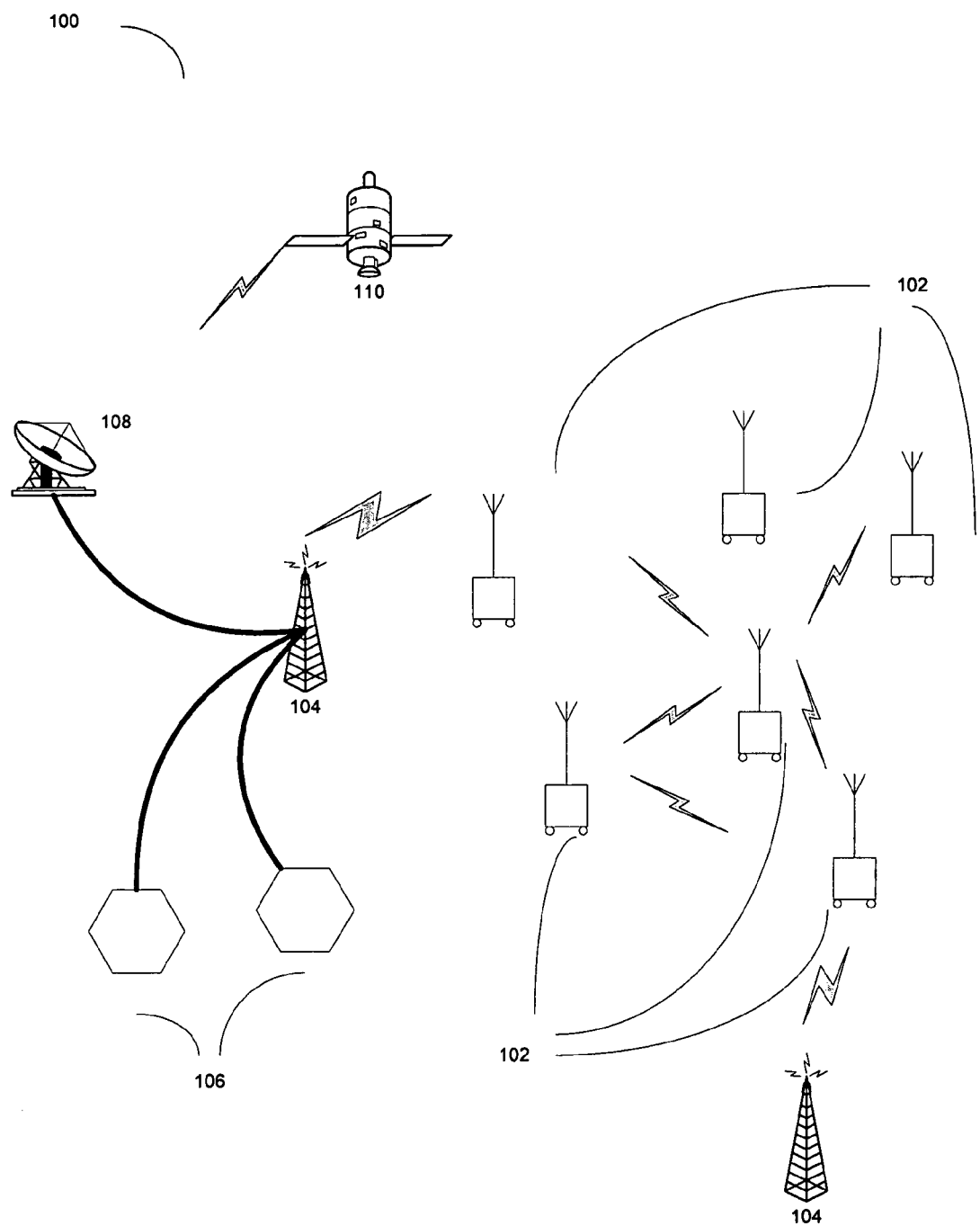
FIG. 1 is a conceptual diagram of a network in which illustrative embodiments of the invention operate.

FIG. 1 is a conceptual diagram of a network 100 in which illustrative embodiments of the invention operate. The network 100 includes communication nodes, which can communicate through a number of channels, both wirelessly and over fixed infrastructure. More specifically, the network 100 includes a plurality of mobile wireless nodes 102, two base stations 104 with wired and wireless capabilities, two hardwired nodes 106, a satellite communication equipped node 108 and a communication satellite 110. The number of each node is merely illustrative in nature. The network 100 can include any number of nodes 102, 104, 106, 108, or 110. The nodes 102, 104, 106, 108, and 110 communicate among each other using, for example, protocol independent multicast (PIM) or a derivative thereof.

Any of the nodes 102, 104, 106, 108, and 110 can be used in the transmission of communications from one point in the network 100 to a second point. The remainder of this application focuses mainly on the transmission of communications among the mobile wireless nodes 102 and fixed wireless nodes, such as base stations 104. These nodes communicate amongst themselves over an ad hoc network.

Figure 2:
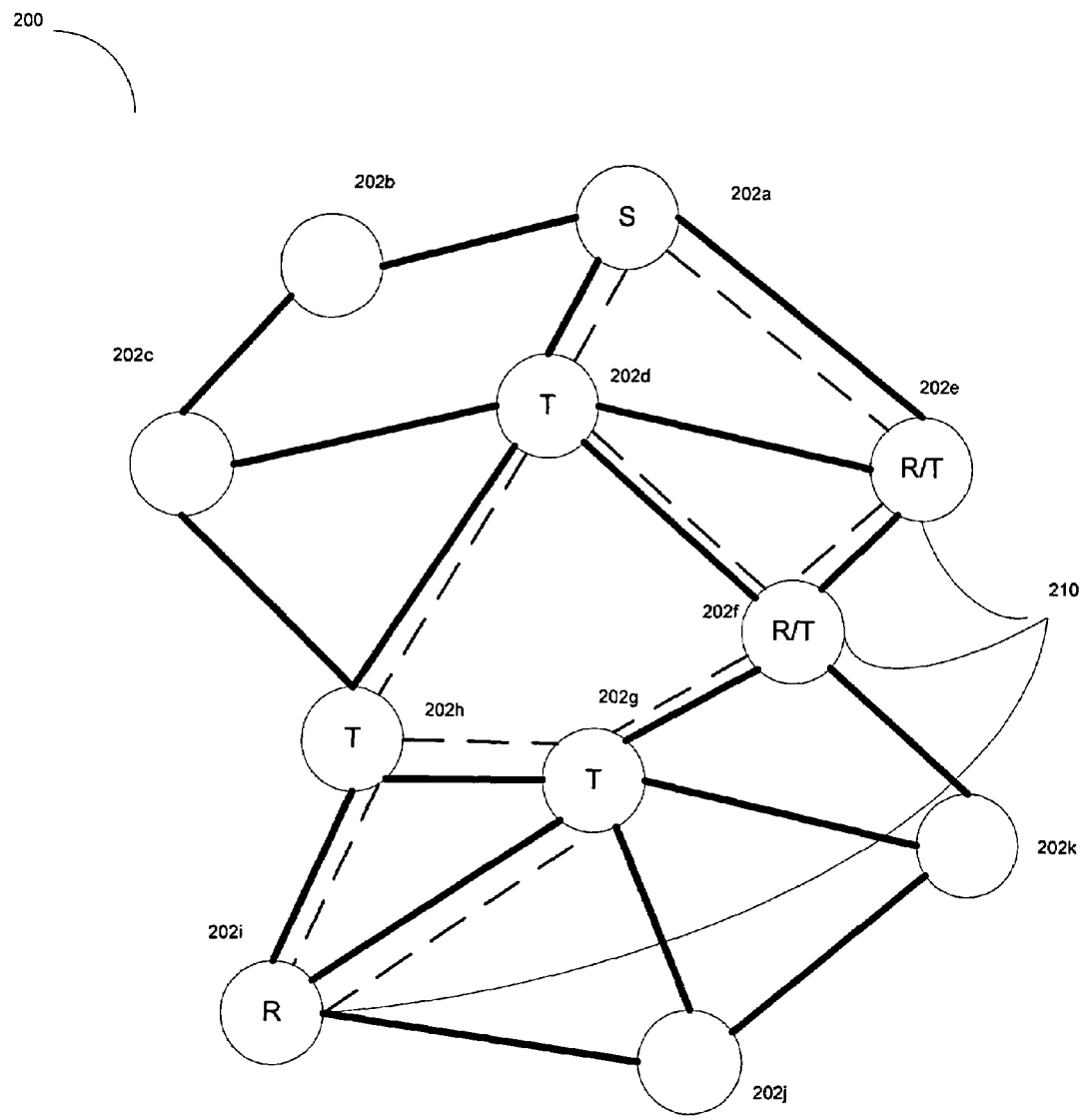
FIG. 2 is a conceptual diagram of an ad hoc network, such as the ad hoc portion of the network depicted in FIG. 1, according to an illustrative embodiment of the invention.

FIG. 2 is another conceptual diagram of a network 200, corresponding, for example to an ad hoc wireless portion of the network 100, according to an illustrative embodiment of the invention. The network 200 includes a plurality of nodes 202a-202k interconnected with each other by at least one physical layer communication channel, in this example radio. Physical layer connections 206 are depicted in FIG. 2 by solid lines between nodes.

The nodes 202a-202k within the network 200 communicate according to a mesh multicast protocol according to the invention. With reference to a communication layering model, such as an OSI communication layering model, the mesh multicast protocol is located at the Subnetwork Layer, between the Network Layer (e.g., the IP layer), and the Data Link Layer (e.g., the radio data link layer). Based on instructions from the network layer to transmit a data packet to a multicast address, the mesh multicast protocol passes the packet and routing instructions to the physical layer to initiate the transmission. To support the mesh multicast protocol, nodes in a network maintain multiple routing paths between themselves and other nodes in the network. Thus, when a node multicasts a message, the message traverses the network to its destination or destinations across multiple paths to provide for routing redundancy. In ad hoc networks, routing redundancy can be particularly helpful, as links between nodes change as nodes move in an out of radio transmission range of each other.

Referring back to FIG. 2, the network 200 includes a multicast group 203. The multicast group 203 includes nodes 202e, 202f and 202i for the source node 202a. According to the mesh multicast protocol of the invention, a multicast group includes a set of receiving nodes sharing a multicast address. A multicast group can include nodes operating in multiple channels connected by regional access points. In addition, nodes within a given network may be connected to other multicast group members through other communication channels, besides radio communication. A node may be a member of multiple multicast groups at the same time. Multicast groups can, but do not have to overlap.

In a given wireless network, multicast group members are connected to a source through a mesh. A source is a node through which a data packet enters the wireless portion of the network base station, such as base station 104 may be a source node. Preferably, source nodes are limited in number and are known to all nodes in the wireless portion of the network. In FIG. 2, the node 202a is a source node. A mesh includes a series of nodes providing multicast forwarding services used to propagate a data packet from a source towards its destination(s). For example, members of the multicast group 203 are connected to the source node 202a via a mesh 204. The mesh 204 includes the nodes 202a and 202d-202i. Links between members of the mesh 204 are depicted in FIG. 2 by broken lines between the nodes. The nodes 202b, 202c, 202j, and 202k are members of the network 200, but they are not members of the mesh 204.

Figure 8:
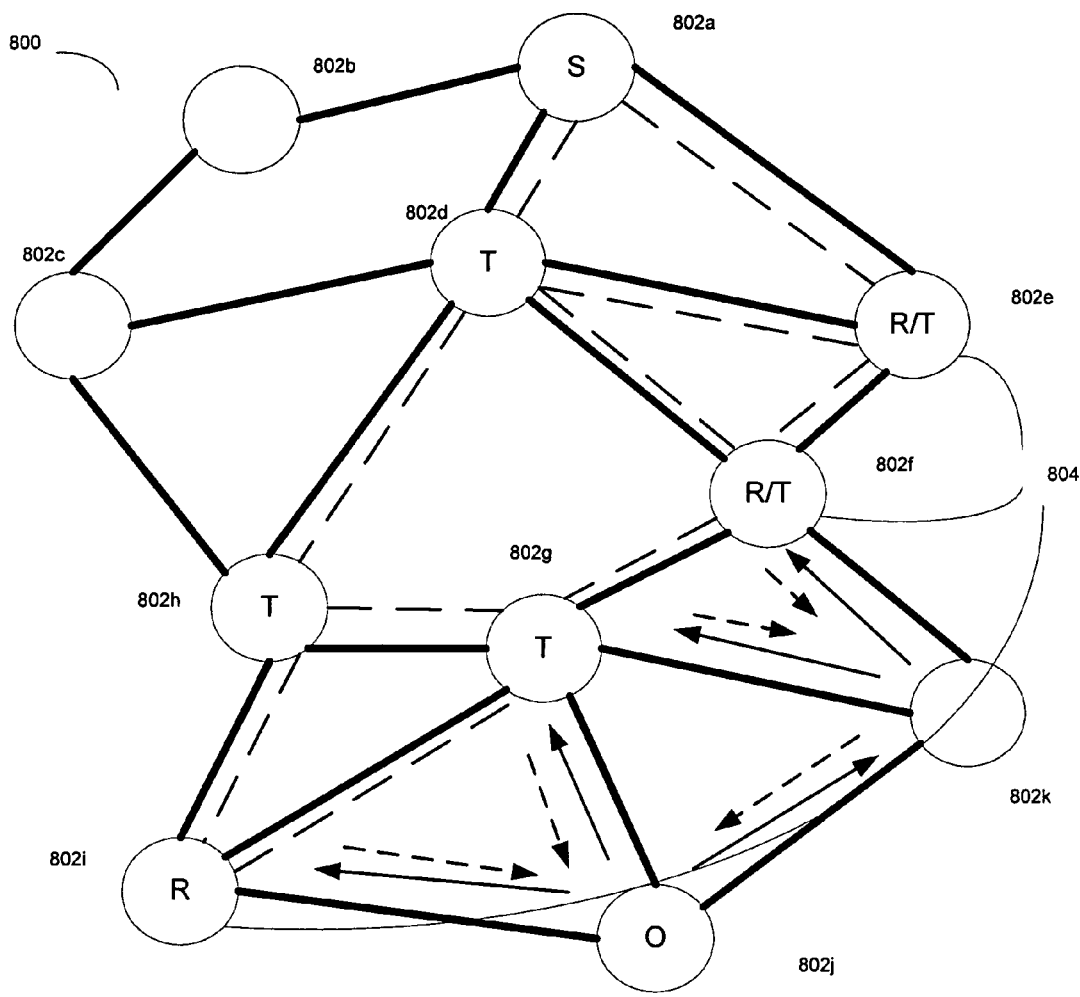
FIG. 8 is a conceptual diagram of a network, such as the network depicted in FIG. 2, and message communication paths through the network, resulting from execution of the node addition method described in FIG. 7, according to an illustrative embodiment of the invention.
Figure 10:
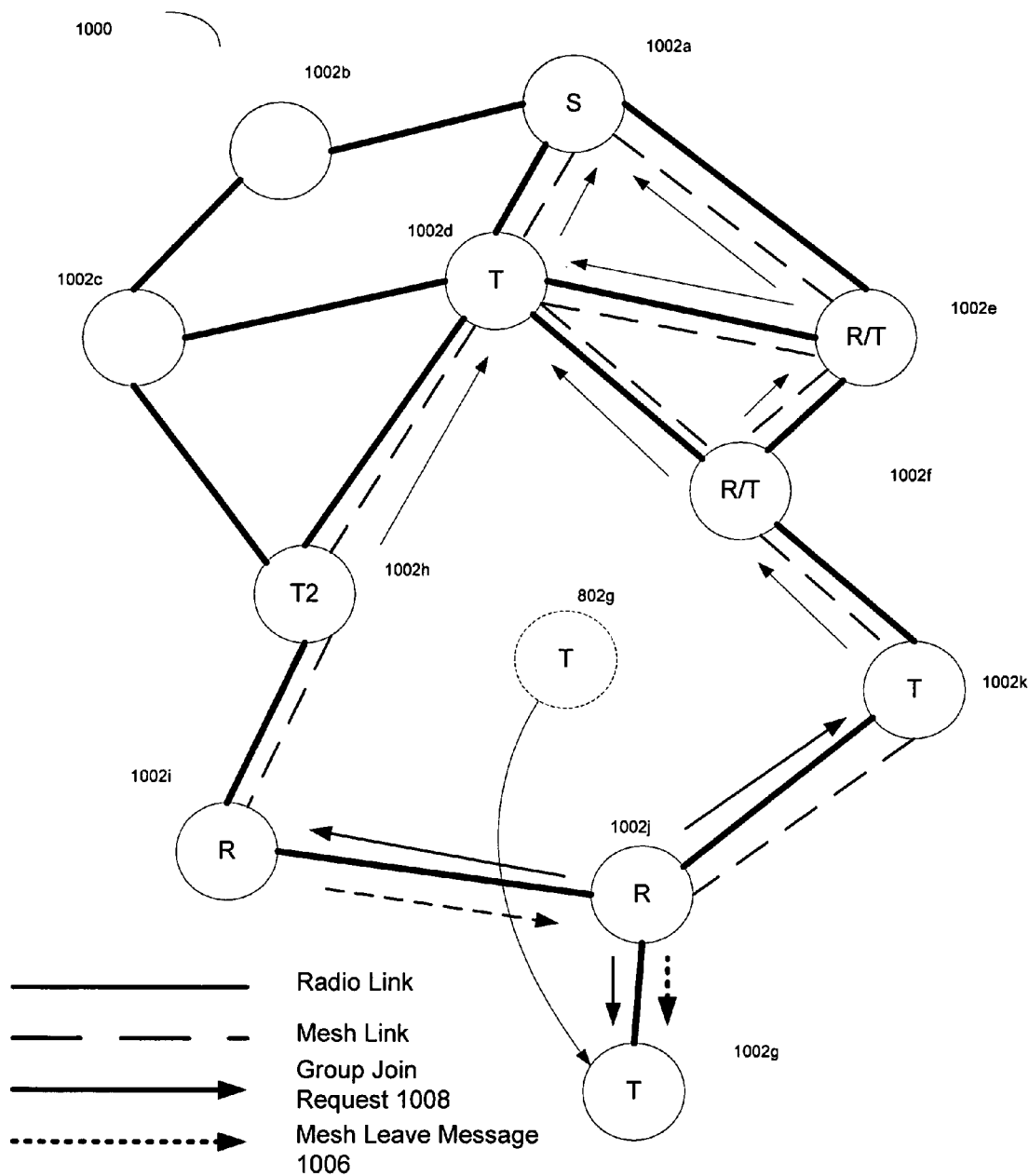
FIG. 10 is a conceptual diagram of a network and the message flow through the network resulting from execution of the method updating mesh links depicted in FIG. 9, according to an illustrative embodiment of the invention.

Each node in a mesh performs one or more functions associated with the mesh multicast protocol, including acting as a source (as described above), a receiver, a transit node, or a receiver/transit node. Receiver nodes receive multicast packets at the physical layer and pass the multicast packets up to the network layer for further processing. Transit nodes receive the multicast packets at the physical layer and forward them to other nodes in the mesh, without passing the multicast packet up to the network layer. Receiver/transit nodes pass multicast packets up to the network layer for further processing, and also forward the multicast packets to other nodes in the mesh. FIGS. 2, 8 and 10 depict a node's function as follows: "S" corresponds to a source node; "R" corresponds to a receiver node; "T" corresponds to a transit node; and "R/T" corresponds to a receiver/transit node.

The function of a node varies depending on the source of a multicast message and the target multicast group. A target-source combination is referred to as a group-source pairing. A node providing a function for a group-source pairing is said to be supporting the group-source pairing. FIG. 2, for example, depicts the functions of the nodes 202a-202k in the network 200 for a group-source pairing of the target multicast group 203 with the source node 202a. The nodes 202d, 202g, and 202h are transit nodes, node 202i is a receiver node, and nodes 202e and 202f serve as both receiver/transit nodes. Nodes without functionality indicators, for example, the nodes 202b, 202c, 202j, and 202k, are physically linked to the nodes within the mesh 204, but they are not members of the mesh 204. If the node 202e were acting as a source for transmitting multicast packets to the multicast group 203, the mesh 204 would likely include a different set of nodes, and each node within the mesh 204 might serve a different function.

Figure 3:
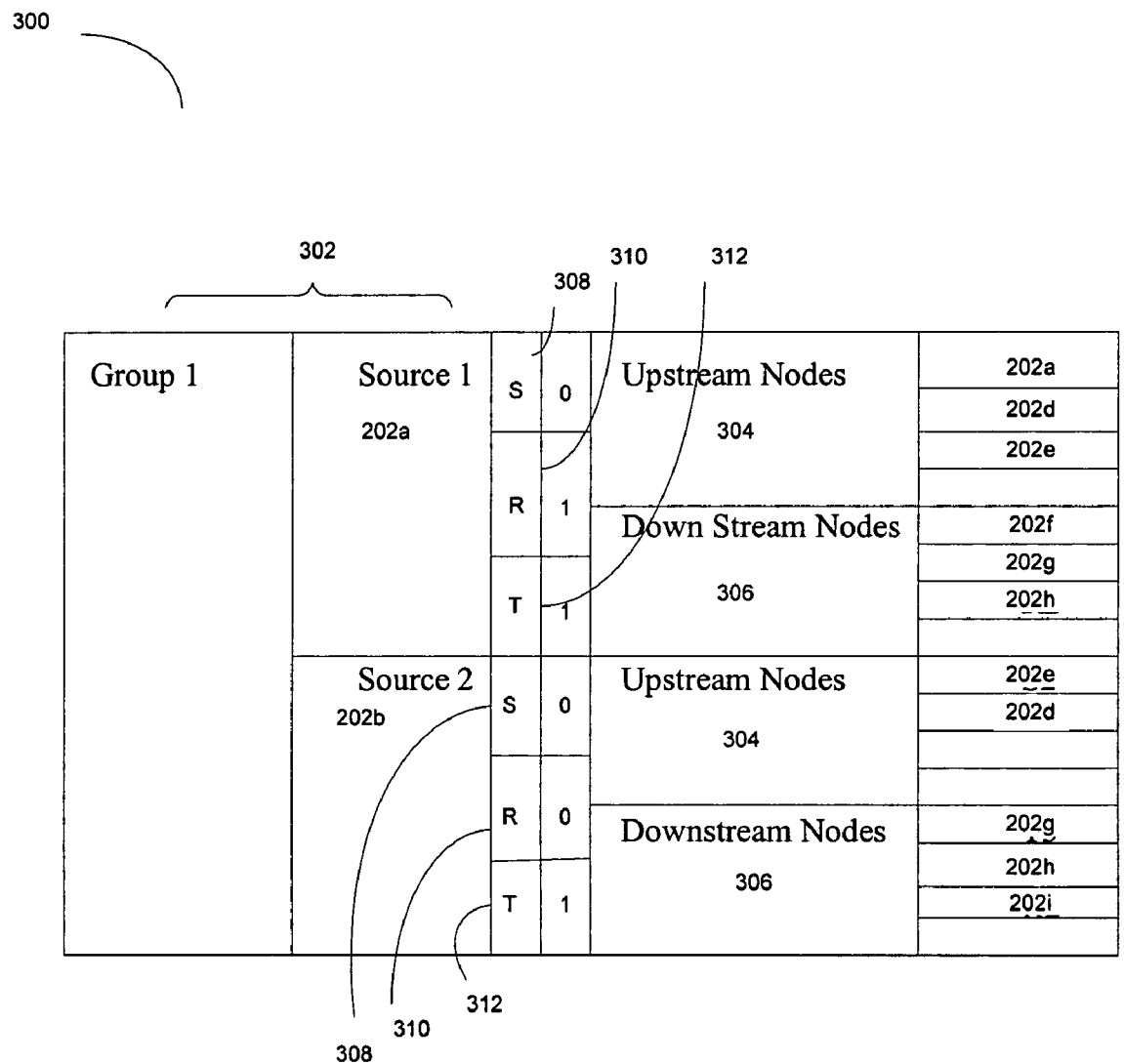
FIG. 3 is an illustrative group table for storing group membership and multicast routing information, which is maintained by a node in the ad hoc portion of the network, such as the ad hoc portion depicted in FIG. 2.

FIG. 3 is an illustrative example of a group table 300, used by nodes to keep track of multicast group membership information and node functionality corresponding to group-source pairings 302 known to the node. For each group-source pairing 302, the group table 300 indicates the node's function(s), an upstream node list 304, and a down stream node list 306.

The group table 300 indicates node functionality using three binary function fields 308, 310 and 312, corresponding to source functionality, receiver functionality, and transit functionality, respectively. A "1" in a function field 308, 310, or 312 indicates that the node serves that function in a mesh for a corresponding group-source pairing 302. If both the receiving function field 310 and the transit function field 312 are set to "1," the node serves as receiver/transit node. A "0" indicates that the node does not serve the corresponding function. The default for value for all function fields is "0". Based on the values stored in the function fields 308, 310, and 312, a node can determine its appropriate reaction to physically receiving a data packet multicast to any multicast group from any multicast source.

The upstream node list 304 may include the source node of the group-source paring 302 (if it is close enough) and nodes located between the node maintaining the group table 300 and the source node. Preferably, the upstream node list 304 includes upstream nodes within one hop of a given node. Downstream nodes are nodes that a given node is responsible, directly or indirectly, for transmitting multicast packets to. Preferably, the downstream node list 306 includes downstream nodes within one hop of the node.

Other data structures storing the above-described data, i.e., node functionality, a list of upstream nodes, and a list of downstream nodes on a group-source pairing by group-source pairing, can be used without departing from the scope of the invention.

One benefit of each node maintaining a group table 300 indicating its role with respect to each group-source pairing 302 is that the nodes, including a source node, in a network do not need to know the roles of other nodes in the network. Nodes also do not need to know the membership of any multicast group. More particularly, according to one feature, a node only needs to know to which multicast groups it belongs, and which group-source pairings it and its neighbors are supporting.

For example, the illustrative group table 300 corresponds to a portion of the group table maintained by the node 202f for the multicast group 203 depicted in FIG. 2. An actual group table for node 202f would likely include data corresponding to other multicast groups to which it belongs. The group table 300 includes two group-source pairings 302a and 302b. The group-source pairing 302a corresponds to FIG. 2, where the node 202a serves as a source transmitting multicast messages to the multicast group 203. The group-source pairing 302b corresponds to circumstances in which the node 202e serves as a source transmitting multicast messages to the multicast group 203.

With respect to the group-source paring 302a, according to the function fields 308, 310, and 312, the node 202f serves as a receiver/transit node, as indicated by the "1"s in the function fields 310 and 312. Thus, upon receiving a multicast packet directed to the multicast group 203 originating from the source node 202a, the node 202f passes the multicast packet up to its network layer. The node 202f also rebroadcasts the data packet for other nodes supporting the group-source pairing 302a to receive. For the group-source pairing 302b, based on function fields 310 and 312, the node 202f serves only as a transit node, rebroadcasting a multicast packet originating from the source 202a to nodes supporting the group-source pairing 302a, without passing the packet up to its network layer.

For the group-source pairing 302a, the upstream node list 304 includes the nodes 202d and 202e. The downstream node list 306 includes the node 202g. In relation to the group-source pairing 302b, the upstream node list 304 includes the nodes 202d and 202e, and the downstream node list 306 includes the node 202g.

In addition to the group table 300, which relates particularly to multicast routing, each node maintains a standard unicast routing table. The unicast routing table includes a distance parameter indicating the cost of communicating between the node and other nodes in the network 200.

Figure 4:
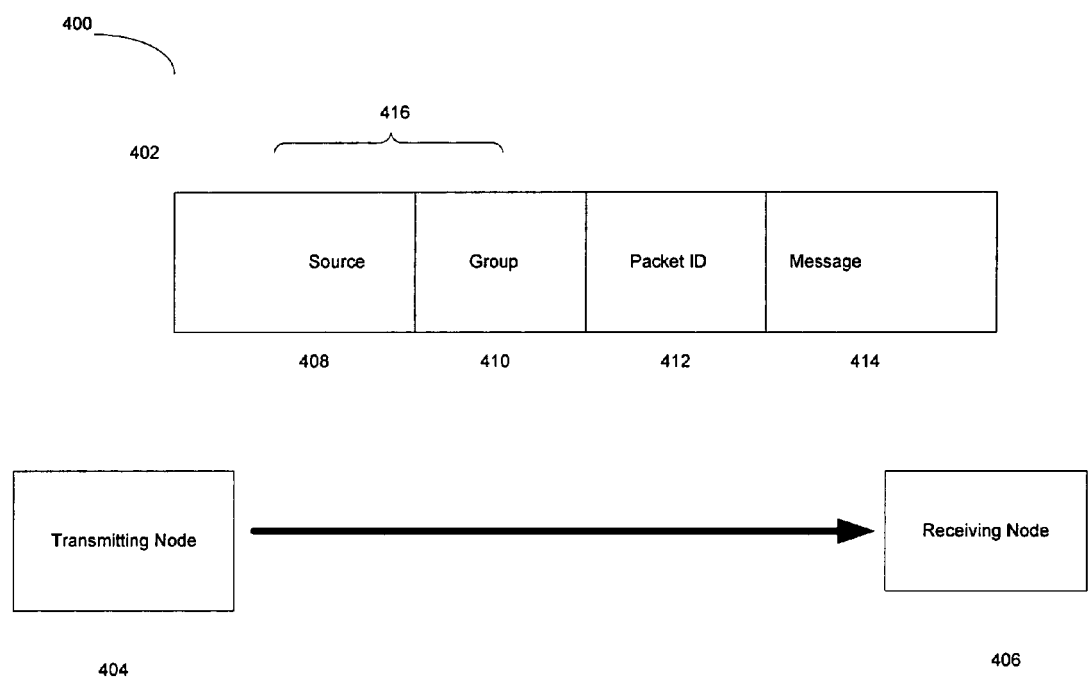
FIG. 4 is a conceptual diagram of a multicast data packet transmission according to an illustrative embodiment of the invention.

FIG. 4 is a conceptual diagram of a multicast data packet transmission 400 according to an illustrative embodiment of the invention. The multicast data packet transmission 400 includes a sending node 404 transmitting a multicast packet 402 to a receiving node 406. The multicast packet 402 includes a source node identification 408, a target multicast group identifier 410, a packet identifier 412, and a data message 414. The combination of the target group identifier 410 with the source node identifier 408 forms a group-source paring 416.

Figure 5:
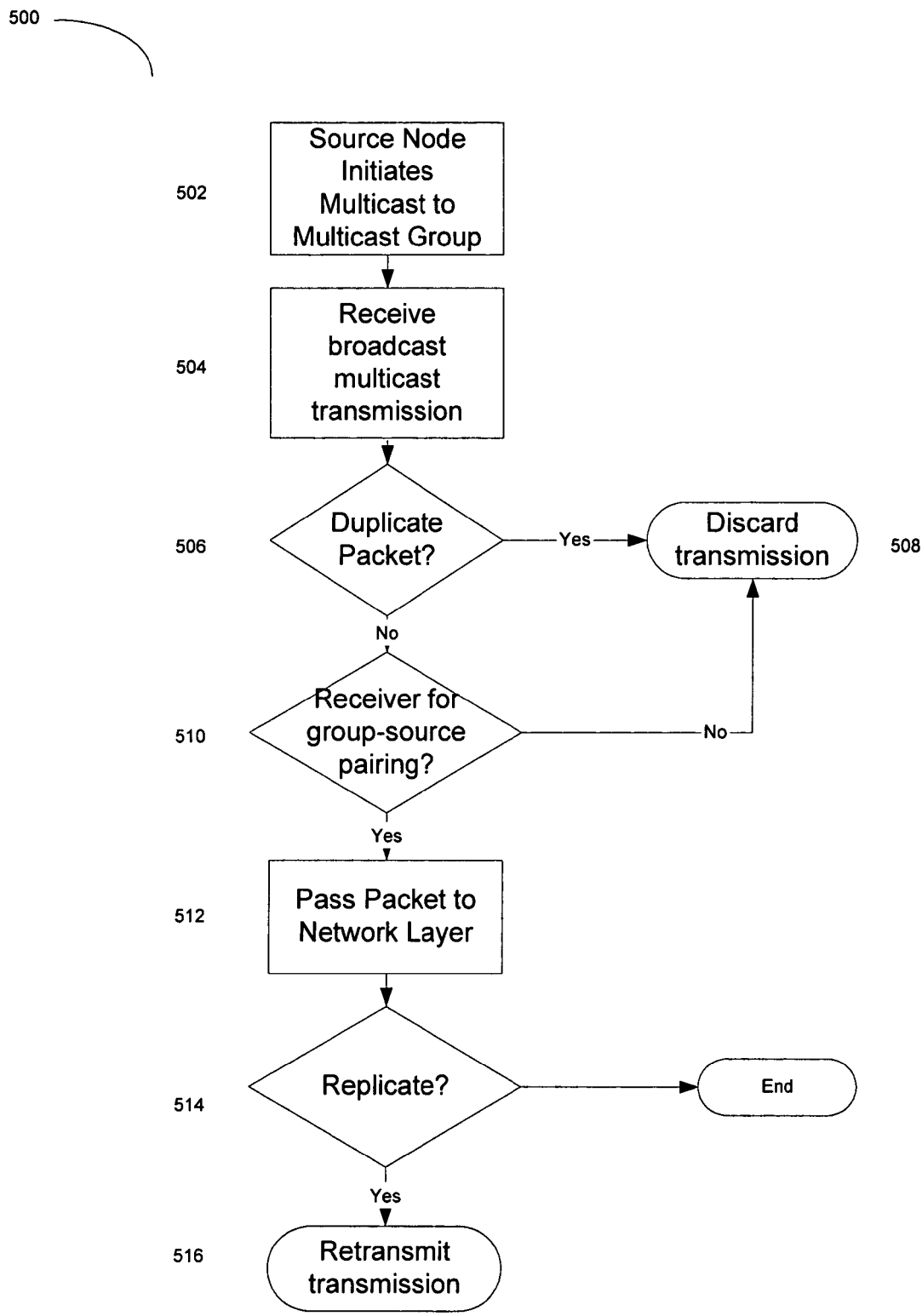
FIG. 5 is a flow chart of a multicasting method through a mesh, such as the mesh depicted in FIG. 2, according to an illustrative embodiment of the invention.

FIG. 5 is a flowchart of a multicasting method 500 through a mesh, such as the mesh 204, according to an illustrative embodiment of the invention. For the sake of clarity, the method 500 is described first in the abstract referring back to FIG. 4, and then, with respect to FIG. 2, in relation to a node 202a transmitting an exemplary multicast packet 402 through the network 200 to the multicast group 203.

Generally, the method 500 begins with a sending node 404 initiating a multicast transmission 400 of a multicast packet 402 (step 502). The nodes having physical layer links with the sending node 404 physically receive the transmitted multicast packet 402 (step 504), and thus are receiving nodes 406. Each receiving node 406 compares the packet identifier 412 in the multicast packet 402 with a stored list of packet identifiers from recently received multicast packets and recently transmitted multicast packets (decision block 506). If the packet identifier 412 of the multicast packet 402 matches a packet identifier stored in the list, the receiving node 406 discards the packet as a duplicate (step 508).

If the receiving node 406 determines that the received multicast packet 402 is not a duplicate at decision block 506, the receiving node 406 determines whether it serves a receiving function for the group-source pairing 416 (decision block 510). To do so, for example, the receiving node 406 checks the value of the receiver function field in its group table corresponding to the group-source pairing 416. If the receiver function field equals "1" the receiving node 406 belongs to the multicast group 410 for the source 408. If such is the case, the receiving node 406 passes the multicast packet 402 up to its network layer (step 512) and proceeds to decision block 514. If the receiver function field equals "0", the receiving node 406 does not belong to multicast group 410, and it bypasses step 512 and proceeds to the decision block 514.

At decision block 514, the receiving node 406 determines whether to replicate the multicast packet 402. The receiving node 406 looks up the entry in its group table corresponding to the group-source pairing 416 included in the multicast packet 402. If the transit function field in the group table entry is set to "1", the receiving node 406 replicates the multicast packet and transmits the replicated packet over one or more communication channels, depending on which nodes are included in its downstream node list (step 516). If the transit function field is set to "0", the receiving node 406 is finished with multicasting the packet.

In an alternative implementation, the multicast mesh protocol of the invention incorporates aspects of a multipoint relaying protocol to reduce network traffic. In such implementations, transit nodes, particularly in densely populated networks, do not always rebroadcast multicast packets. One process of reducing the number of rebroadcasting nodes while still providing reliable multicast communication via the multipoint relaying protocol is described for example in "Multipoint Relaying: An Efficient Technique for Flooding in Mobile Wireless Networks," by Laouiti et al (2002), the entirety of which is incorporated by reference. To accommodate the requirements of the multipoint relaying protocol, each node maintains a data table including a list of all downstream neighbors within two hops.

For an example execution of the multicasting method 500, referring back to FIGS. 2 and 4, assume the node 202*a* initiates a multicast transmission 400 of a multicast packet 402 to the multicast group 203 (step 502). The multicast packet 402 indicates that the node 202*a* is the source node 408 and that the multicast group 203 is the target multicast group 410. The nodes 202*b*, 202*d,* and 202*e*, physically receive the data packet transmitted by node 202*a* (step 504) over the physical layer links 206. Each node 202*b*, 202*d,* and 202*e* thus act as receiving nodes 406. The group table of the node 202*b* does not include the group-source pairing 416. As mentioned above, by default, the values of the receiver function field and the transit function field for the group-source pairing 416 are "0." Thus, at decision block 510, the node 202*b* bypasses passing the multicast packet 402 to the network layer. Similarly, at decision block 514, the node 202*b* determines not to rebroadcast the data packet 402. In contrast, the nodes 202*d* and 202*e* determine that they belong to the target multicast group 410 at decision block 510, and therefore pass the multicast packet to their network layer (step 512). Subsequently, after a review of their corresponding group tables at decision block 514, the nodes 202*d* and 202*e* both rebroadcast the multicast packet 402, using the same packet identifier 412 included in the received data packet 402 (step 516).

As a result of the node 202*e* rebroadcasting the data packet 402 (step 516), the nodes 202*a*, 202*d,* and 202*f* receive the rebroadcast (step 504). Upon receiving the rebroadcast, the nodes 202*a* and 202*d* determine that they have already received and/or transmitted the multicast packet 402 based on the packet identifier 412 of the multicast packet 402 (decision block 506). The node 202*a* originated the packet, and node 202*d* already received and rebroadcast the packet, as described above. Thus, the nodes 202*a* and 202*d* discard the duplicate packet (step 508). The node 202*f* determines the packet is not a duplicate at decision block 506, and that it belongs to the multicast group identified in the group-source pairing 416 of the multicast packet 402 (decision block 510). The node 202*f* therefore passes the multicast packet up to its network layer (step 512). Based on its group table for the identified group-source pairing 416, the node 202*e* determines to rebroadcast the data packet (step 516) at (decision block 514). The method 500 repeats until all nodes receiving the data packet determine they are not to rebroadcast the data packet.

Figure 6:
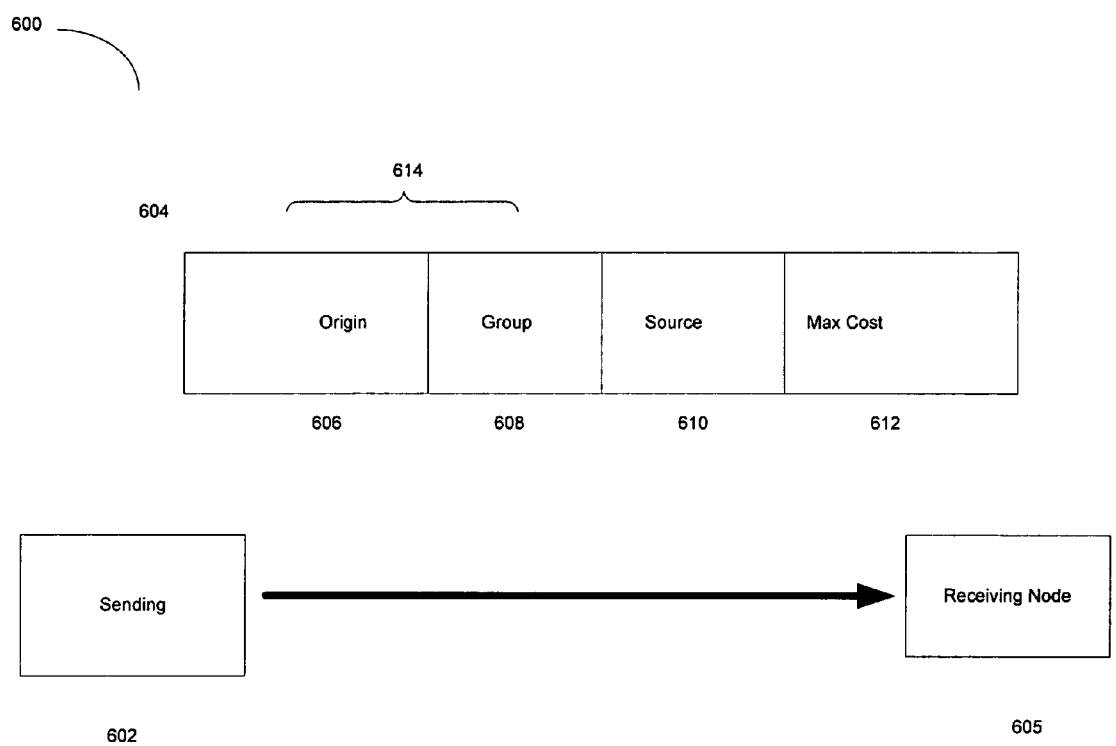
FIG. 6 is a conceptual diagram of a mesh join request transmission utilized by nodes in the network depicted in FIG. 2 for joining a multicast group, according to an illustrative embodiment of the invention.
Figure 7:
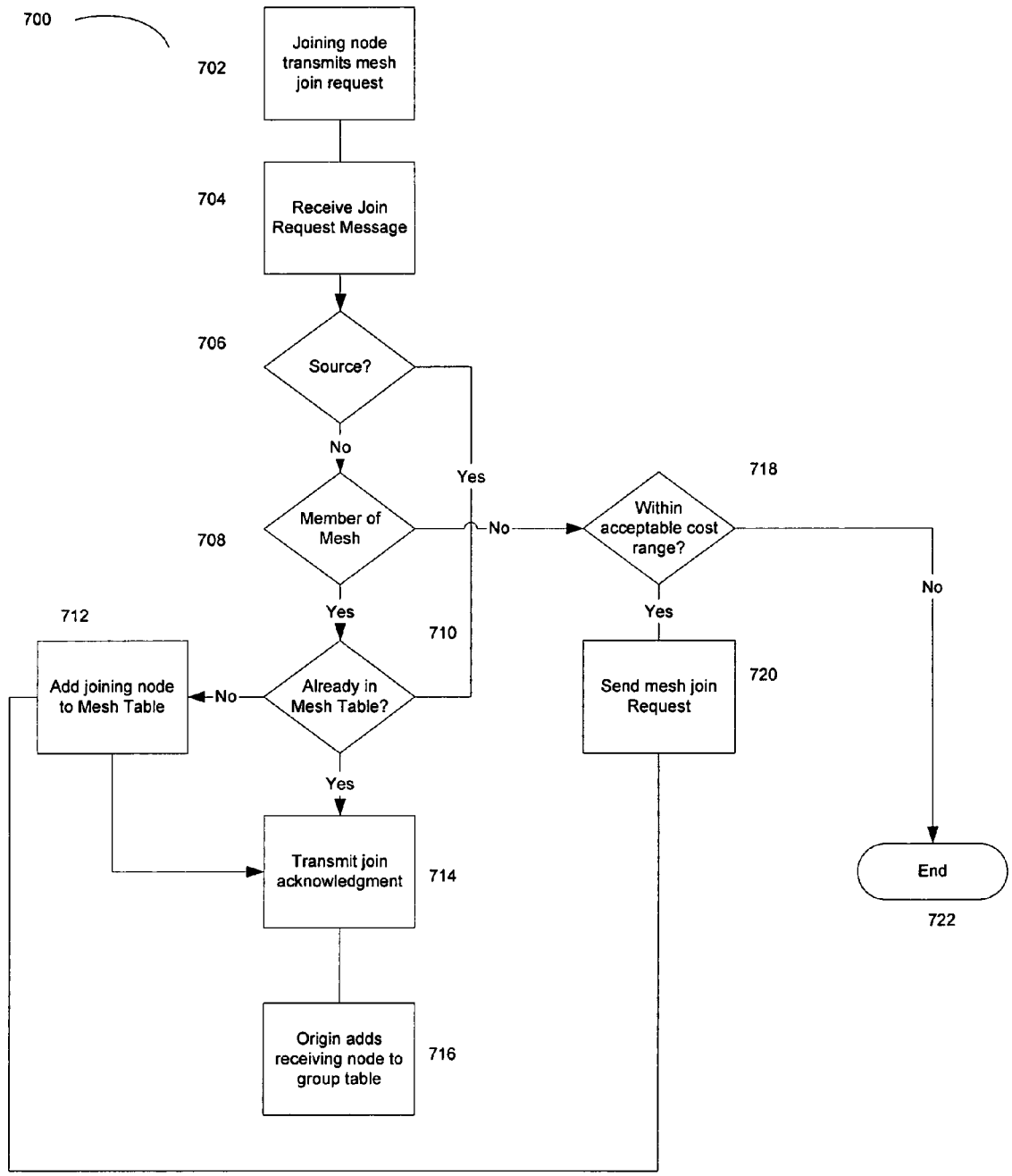
FIG. 7 is a flow chart of an illustrative node addition method for adding a node to a multicast group using the transmission of mesh join requests, such as the mesh join request transmission described in FIG. 6, according to an illustrative embodiment of the invention.

FIGS. 6-8 illustrate aspects of a process for adding a node to a multicast group for a particular group-source pairing according to an illustrative embodiment of the invention. In particular, FIG. 6 is a conceptual diagram of a mesh join request transmission 600 utilized in the process. FIG. 7 is a flowchart of an illustrative node addition method 700 corresponding to the process. FIG. 8 is a conceptual diagram of a network 800 and message communication paths through the network 800, resulting from execution of the node addition method 700. As with the rebroadcasting method 500 described above, the node addition method 700 is first described generally. A specific example of an execution of the node addition method 700 is then described with reference to network 800.

FIG. 6 is a conceptual diagram of a mesh join request transmission 600 according to an illustrative embodiment of the invention. The mesh join request transmission 600 includes a sending node 602 transmitting a mesh join request 604 to a receiving node 605. The mesh join request 604 includes an origin 606, a group 608, a source 610, and a maximum cost 612. The origin 606 corresponds to the sending node 602 that transmitted the mesh join request 604. The group 608 corresponds to the multicast group the origin 606 is requesting to join. The source 610 corresponds to the node within the network from which the origin 606 is requesting to receive multicast messages. The combination of the group 608 and the source 610 form a group-source pairing 614. The maximum cost 612 corresponds to a maximum communication cost that the origin 606 will accept for a new mesh link. Communication cost can be measured in terms of number of hops, or total energy output necessary for transmission between two points. In general, the cost of communicating between two closely located nodes is less than the cost of communicating between two nodes that are farther apart. The maximum cost 612, in one exemplary implementation, is equal to the unicast cost of the origin 606 communicating with the source 608 via a unicast transmission. That is, in this particular implementation, the origin 606 indicates that it will not join a mesh through a node that is further from the source than it is itself. In other implementations, the maximum cost 612 may be lower than the unicast communication cost, depending on the desired level of routing redundancy and the network density. A higher maximum cost 612 tends to result in additional redundancies. A lower maximum cost 612 tends to result in fewer routing loops.

Referring to FIG. 7, which depicts the illustrative node addition method 700, and FIG. 6, the node addition method 700 begins with an origin 606 transmitting a mesh join request 604 (step 702). The origin 606 transmits a mesh join request (step 702) upon receiving instructions to join group 608 to receive multicast packets originating from the source 610. In addition, the origin 606 transmits a mesh join request (step 702) in response to determining that it has insufficient upstream neighbors in its group table for a group-source pairing.

Nodes having physical layer links to the origin 606 receive the mesh join request 604 (step 704). Upon receipt, a receiving node 605 determines whether it is the source node identified in the mesh join request 604 (decision block 706). If the receiving node 605 is not the source 610, the receiving node 605 determines whether it is a member of the mesh supporting the group-source pairing 614 identified in the mesh join request 604 at decision block 708. If the receiving node 605 supports the group-source paring 614, the receiving node 605 proceeds to decision block 710. Referring back to decision block 708, if the receiving node is the source, the receiving node 605 bypasses decision block 708 to decision block 710.

At decision block 710, the receiving node 605 determines whether the origin 606 is currently listed in its group table as a downstream node for the group-source paring 614. If the origin 606 is not listed in the group table for the group-source paring 614, the receiving node 605 adds the origin 606 as a downstream node (step 712). Subsequently, or if the origin 606 was already in the group table, the receiving node 605 transmits a join acknowledgement message back to the origin 606 (step 714). Alternatively, prior to transmitting the join acknowledgement message, the receiving node 605 can check to see if the origin 606 is already included in the upstream node list of the receiving node 605. If the origin 606 is already an upstream node for the receiving node 605, the receiving node determines whether it is upstream or downstream to the origin 606 and alters its upstream and downstream node lists accordingly. Upon receipt by the origin 606 of the join acknowledgement message, the origin 606 adds the receiving node 605 to its upstream node list in its group table.

Referring back to decision block 708, if the receiving node 605 is not a member of the mesh supporting the group-source paring 614, the receiving node 605 determines whether to join the mesh as a transit node to forward multicast packets to the origin 606 (decision block 718). The receiving node, in this implementation, bases its determination on the maximum cost 612 in the group join message 604. If the cost of the receiving node 605 communicating with the source 610, based on the receiving node's unicast routing table, is less than the maximum cost 612, the receiving node 605 attempts to join the mesh by transmitting its own mesh join request (step 720). The mesh join request of receiving node 605 identifies the node 605 as the origin instead of the origin 606 included in the initial mesh join request 604. The receiving node 605 then proceeds to step 712 as if it had belonged to the mesh at the start of the node addition method 700.

Referring back to decision block 718, if the cost of the receiving node 605 communicating with the source 610 exceeds the maximum cost 612 the receiving node 605 ceases further processing of the mesh join request message (step 722).

In an alternative implementation of the node addition method 700, the origin 606 selects a configurable predetermined number of one hop neighbors from its unicast routing table as targets of the mesh join request 604. In this implementation, the mesh join request 604 need not include a maximum distance 612. The origin 606 either unicasts the mesh join request 604 to the selected one hop neighbors or the origin includes a list of the selected one hop neighbors in the mesh join request 604. If the mesh join request is unicast, the receiving node 605 can bypass the decision block 718. If the mesh join request includes a list of the selected one-hop neighbors, the receiving node determines whether it is on the list at decision block 718, instead of comparing communication costs. Selection of a larger number of upstream nodes results in greater redundancy in exchange for extra data traffic.

FIG. 8 is a conceptual diagram of a network 800 of wireless nodes 802a-802k, similar to the network 200 depicted in FIG. 2, in which a node 802j is requesting to join a multicast group, specifically multicast group 804. The multicast group 804 includes nodes 802e, 802f, and 802i. In particular, the node 802j requests to join multicast group 804 to receive multicast messages from the node 802a. The mesh 805, including the nodes 802a and 802d-802i, supports the transport of multicast messages from the node 802a to the multicast group 804. As in FIG. 2, solid lines in FIG. 8 correspond to physical links 806 between nodes. Broken lines correspond to mesh links 808.

As described above in relation to FIGS. 6 and 7, the process of a node, such as the node 802j joining a multicast group, such as the multicast group 804, begins with the node 802j transmitting a mesh join request 604 (step 702). The mesh join request 604 identifies the node 802j as the origin 606, the multicast group 804 as the group 608, and the node 802a as the source 610. Message join requests 604 are depicted on FIG. 8 as arrows having solid lines. The nodes 802g, 802i, and 802k that have physical links with the node 802a, and thus the nodes 802g, 802i, and 802k, receive the mesh join request.

The node 802g, upon receipt of the mesh join request 604, determines that it is not the source 610 identified in the mesh join request 604 (decision block 706) and that it is a member of the mesh 805 (decision block 708). The node 802g determines that the node 802j is not currently listed in its group table as belonging to the mesh 805 for the group-source pairing 614 (decision block 710). Accordingly, the node 802g adds the node 802j as a downstream node for the group-source pairing 614 in its group table (step 712). The node 802g also transmits a join acknowledgement message 810, depicted as an arrow with a broken line, back to the node 802j (step 714). The node 802i responds to the receipt of the mesh join request 604 in the same fashion as the node 802g, also resulting in the node 802i transmitting a join acknowledgement message 810.

The node 802k, in contrast, is not a member of the mesh 805 when it receives the mesh join request 604 (step 704). Accordingly, the node 802k determines whether it is sufficiently close to the source 610, node 802a, to join the mesh 805 as a transit node for the node 802j (decision block 718). Assuming that the node 802k is close enough to the node 802a, the node 802k initiates a new mesh join request (step 720). The node adds node 802j as a downstream node (step 712). The node 802k ends its processing of the mesh join request 604 by transmitting a join acknowledgment message 810 to the node 802j (step 714). Upon receipt of the join acknowledgement messages 810 from the nodes 802g, 802i, and 802k, the node 802j adds the nodes to its upstream node list in its group table.

Figure 9:
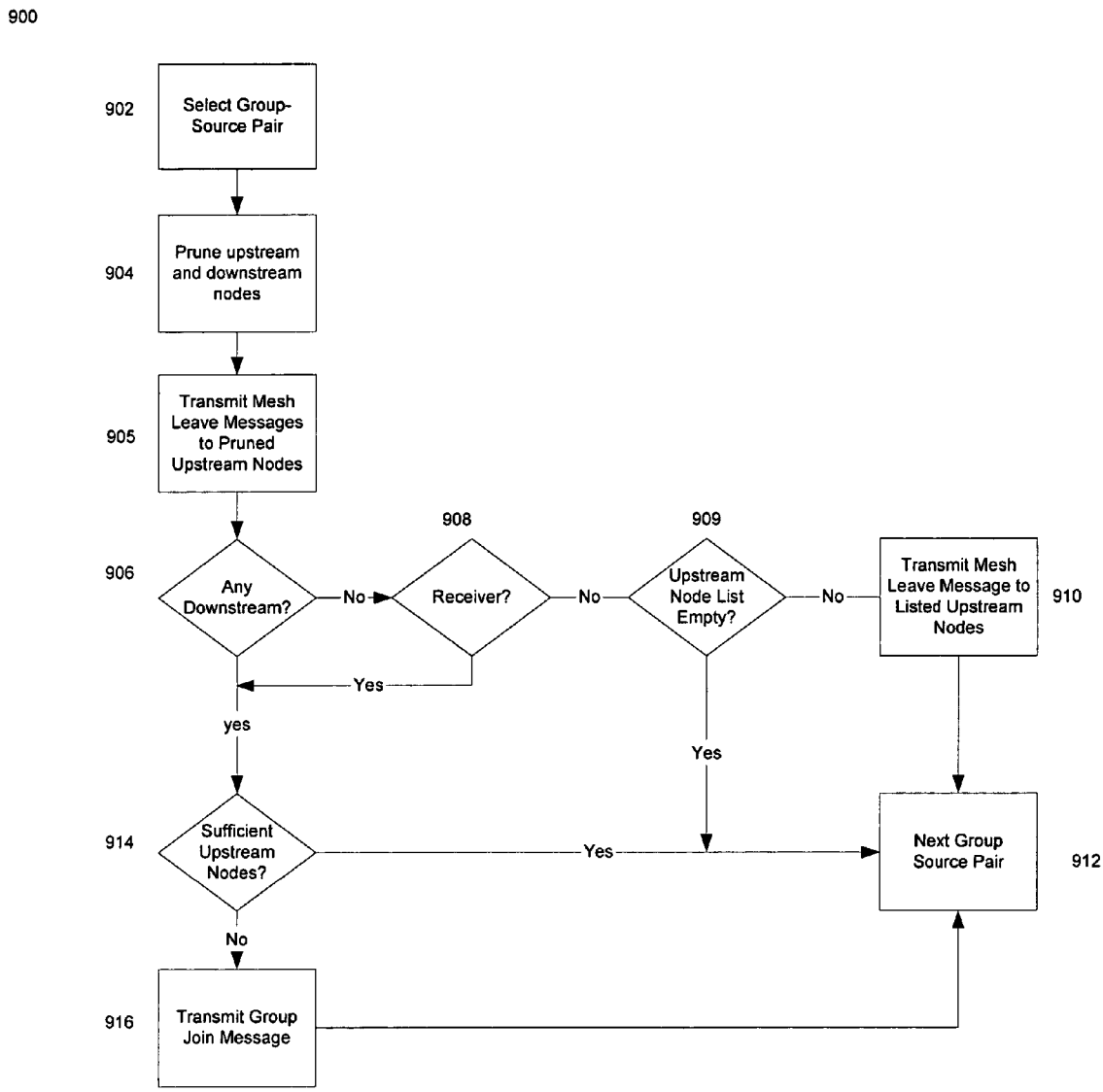
FIG. 9 depicts a method of updating mesh links in a network to accommodate node movement, according to an illustrative embodiment of the invention.

FIG. 9 depicts a mesh update method 900 of updating mesh links in a network to accommodate node movement, according to an illustrative embodiment of the invention. FIG. 10 conceptually depicts an illustrative message flow through an illustrative network 1000 of nodes 1002a-1002k resulting from execution of the mesh update method 900 by the nodes 1002g, 1002i, and 1002j.

From time-to-time, or in some implementations, on a periodic basis, nodes operating according to the mesh multicast protocol of the invention execute a mesh update method, such as the mesh update method 900. The update begins with a node selecting a first group-source pairing that the node supports (step 902). The node prunes its upstream and downstream node lists for the selected group-source pairing based on recent updates to its unicast routing table (step 904). For the pruning process, the node compares the distance between itself and corresponding source node of the selected group-source pairing with the distance between each upstream node and the source. If an upstream node is less than a predetermined amount closer to source than the upstream node, or the node has a configurable, predetermined number of other one hop neighbors closer to the source than the upstream node, the node removes the upstream node from its group table for the group-source pairing. The node then sends a mesh leave message to the removed upstream nodes (step 905) to indicate that the removed upstream nodes can remove the node from their downstream node lists for the group-source pairing. The node also removes any upstream or downstream node that is more than one hop away.

After pruning its group table, the node determines whether there are any downstream nodes remaining in its group table corresponding to the group-source pairing (decision block 906). If the group table no longer lists any downstream nodes for the group source pairing, the node determines whether it serves a receiving function for the group-source pairing (decision block 908). If the node does not provide a receiving function, the node determines whether it needs to issue a mesh leave message (decision block 909). If the node has any nodes remaining in its upstream node list for the group-source pairing, the node issues a mesh leave message (step 910) to the listed nodes. The mesh leave message instructs the listed nodes to remove the node from their downstream node lists in their group tables for the corresponding group-source pairing. The node then evaluates the next group-source paring in its group table (step 912), if any remain. In one particular implementation, the node only issues a mesh leave message after the node determines it has been without downstream nodes for a predetermined period of time or predetermined number of review cycles. If the node's upstream node list is empty for the group-source pairing, the node begins evaluating the next group-source pairing in its group table (step 912).

If the node either had downstream nodes listed in its group table for the group source pairing and/or or if the node functions as a receiver for the group-source pairing, the node determines whether it has a sufficient number of upstream nodes remaining in its group table to receive multicast messages corresponding to the group-source pairing a configurable, predetermined number of times (decision block 914). A larger number results in greater redundancy, while a smaller number results in less network traffic. Thus, the predetermined number of times may be configured depending on traffic levels and node density in the network. If the node has a sufficient number of upstream nodes, it begins evaluating the next group-source pairing in its group table. Otherwise, it transmits a mesh join request to enlist the services of additional upstream nodes (step 916). The node then begins evaluating the next group-source pairing (step 912) in its group table. Utilizing the mesh update method 900, nodes in a network can update their mesh memberships and functionalities locally, without needing global oversight of the mesh.

FIG. 10, as mentioned above, is a conceptual diagram of a network 1000 of nodes 1002a-1002k depicting message flow arising from the nodes 1002g and 1002j executing the mesh update method 900, according to an illustrative embodiment of the invention. FIG. 10 depicts a group source pairing of multicast group 1004, source node 1002a, corresponding roughly to the group-source pairing depicted in FIG. 8. However, FIG. 10 depicts the results of the node 802j having joined the multicast group 804 of FIG. 8 to form multicast group 1004 of FIG. 10. In addition, in the network 1000, the node 1002g (node 802g in FIG. 8) has moved to a new location with respect to the remaining nodes. Prior to the movement of the node 802g, as depicted in FIG. 8, the node 802g/1002g served as a transit node forwarding multicast packets to the node 802i (and the nodes 802j and 802k after they joined the mesh 805 as a result of the node 802j initiating the node addition method 700).

During the process of the node 1002j executing the mesh update method 900, it removes the node 1002g as an upstream node, because the node 1002g is further away from the source node 1002a than the node 1002g is, itself (step 904). The node 1002j then transmits a mesh leave message to the node 1002g indicating that node 1002g should remove node 1002j as a downstream node (step 905). The node 1002j has no downstream nodes, as determined at decision block 906, and at decision block 914 determines whether it has sufficient upstream nodes. If the configurable, predetermined number of desired upstream nodes is two or less, the node 1002j has a sufficient number (i.e., nodes 1002i and 1002k). Otherwise, the node 1002j transmits a mesh join request 1008 (step 916), before reviewing the remaining group source pairings in its group table.

Subsequently, when the node 1002g executes the mesh update method 900 as depicted in FIG. 10, it first prunes its group table (step 904). In doing so, it removes the nodes 1002i and 1002k from its downstream node list because they are now two hops away from node 1002g. Node 1002j was removed as a downstream node in response to the node 1002g receiving the mesh leave message sent by node 1002j, as described above. The node 1002g also removes the nodes 1002f and 1002h as upstream nodes because they are more than two hops away. No mesh leave messages are necessary at this stage because the pruned upstream nodes are more than one hop away. At decision block 906, the node 1002g determines it has no nodes listed in its downstream node list. The node 1002g determines it does not serve a receiving function at decision block 908 and that it has no upstream nodes left in its upstream node list at decision block 909. Thus, node 1002g begins evaluating other group-source pairings (step 912).

The invention may be embodied in other specific forms without departing form the spirit or essential characteristics thereof. The forgoing embodiments are therefore to be considered in all respects illustrative, rather than limiting of the invention.

What is claimed is:

1. A method of adding a first node to a mesh of nodes in a network, comprising:
   receiving a mesh join request at a second node transmitted by the first node, the mesh join request indicating a multicast group and a source node from which the first node requests to receive messages;
   determining by the second node whether the second node belongs to a mesh that transmits multicast packets originating from the source node to the multicast group identified in the mesh join request; and
   in response to determining that the second node belongs to such a mesh, adding the first node, by the second node, to a list of downstream nodes to which the second node transmits multicast packets directed to the identified multicast group originating from the identified source node.

2. The method of claim 1, comprising in response to determining that the second node does not belong to such a mesh, transmitting a mesh join request by the second, node requesting to join such a mesh.

3. The method of claim 1, comprising transmitting, by the second node, a join acknowledgement message to the first node.

4. The method of claim 1, wherein the mesh join request includes a maximum distance parameter, the method comprising in response to determining that the second node does not belong to such a mesh, determining by the second node whether it is less than the maximum distance parameter away from the source node.

5. The method of claim 4, comprising in response to determining that the second is less than the maximum distance away from the first node, transmitting by the second node a request to join such a mesh.

6. The method of claim 4, wherein the determination of whether the second node is less than the maximum distance parameter away from source node comprises comparing the maximum cost parameter with a distance parameter stored by the second node in a unicast routing table.

7. The method of claim 1, comprising maintaining by the first node, a group table, the group table including a list of group-source pairings that the second node supports.

8. The method of claim 7, wherein the group table comprises, for each group-source pairing, data indicating the role the first node serves with respect to the group source pairing, a list of upstream nodes, and a list of downstream nodes.

9. A method of receiving multicast packets by a first node directed to a multicast group from a known source node in a wireless network comprising:
   transmitting by the first node a mesh join request identifying the multicast group and the known source node;
   awaiting, by the first node an acknowledgement message indicating that a second node has added the first node to a mesh of nodes which transmits multicast packets originating from the identified source node directed to the identified multicast group;
   adding the second node by the first node to a list of upstream nodes responsible for forwarding multicast packets originating from the identified source node to the identified multicast group; and
   receiving by the first node multicast packets which are directed to the identified multicast group, transmitted by the second node, and originated from the identified source node.

10. The method of claim 9, comprising:
    selecting by the first node, based on a unicast routing table, a set of second nodes that are closer to the source node than the first node; and
    wherein the mesh join request is transmitted to the selected set of second nodes.

11. The method of claim 9, comprising retransmitting the mesh join request by the first node until the first node receives join acknowledgement messages from a configurable, predetermined number of second nodes.

12. The method of claim 11, wherein the predetermined number of second nodes is configured based on the density of nodes in the wireless network.

13. The method of claim 11, wherein the predetermined number of second nodes is configured based on a desired level of routing redundancy.

14. A method of maintaining a multicast mesh comprising:
    reviewing a group table maintained by a first wireless node to determine, by the first wireless node, whether a predetermined minimum number of neighboring nodes in the multicast mesh remain upstream with respect to the first wireless node in relation to a source node remain available for transmitting multicast messages to the first wireless node; and
    in response to determining that an insufficient number of such neighboring nodes remain, broadcasting, by the first wireless node, a mesh join request to locate another node to serve as an upstream neighbor with respect to the first wireless node in relation to the source node.

15. The method of claim 14, wherein the group table includes a list of group-source pairings which the first wireless node supports, wherein each group-source pairing corresponds to a combination of a target multicast group and a specific source node that originates multicast messages for the target multicast group.

16. The method of claim 15, wherein for each group-source pairing, the group table includes data identifying the role of the first wireless node with respect to the group-source pairing, a list of upstream nodes, and a list of downstream nodes.

17. The method of claim 16, comprising removing nodes from the lists of upstream nodes and downstream nodes based on data maintained by the first wireless node in a unicast routing table.

18. A method of maintaining a multicast mesh comprising:
    selecting by a first wireless node a multicast mesh that the node supports;
    reviewing a group table maintained by the first wireless node to determine, by the first wireless node, for the multicast mesh, whether the first wireless node is responsible for forwarding multicast packets to members of a multicast group originating from a specific source node; and
    in response to determining that the first wireless node is not responsible for forwarding multicast packets to the multicast group originating from the specific source node, transmitting a mesh leave message to inform nodes upstream to the first wireless node that the first wireless node no longer needs to receive such packets.

19. The method of claim 18, wherein the group table includes a list of group-source pairings which the first wireless node supports, and wherein each group-source pairing corresponds to a combination of a target multicast group and a specific source node that originates multicast messages for the target multicast group.

20. The method of claim 19, wherein for each group-source pairing, the group table includes data identifying the role of the first wireless node with respect to the group-source pairing, a list of upstream nodes, and a list of downstream nodes.

21. The method of claim 19 wherein the selected multicast mesh corresponds to group-source pairing in the group table.

22. A method of multicasting comprising:
    receiving, by a first node having a radio layer and a network layer, a multicast packet at the radio layer, the multicast packet identifying a target multicast address and a source node from which the multicast packet originated;
    determining, by the first wireless node, a group-source pairing corresponding to the multicast packet based on the identified multicast group address and the identified source node;
    determining by the first wireless node whether the first wireless node provides any functionality in relation to the group-source pairing;
    in response to the first wireless node determining that it provides a receiving function, passing the multicast packet to the network layer; and
    in response to the first wireless node determining that it provides a transit function, forwarding the multicast packet to a second node.

23. The method of claim 22, comprising determining whether the received multicast packet is a duplicate by comparing a packet identifier included in the multicast packet with a list of recently received and transmitted packet identifiers maintained by the first wireless node.

24. The method of claim 23, comprising discarding the multicast packet in response to determining it is a duplicate.

25. The method of claim 22, wherein the step of determining if the first wireless node provides any functionality with respect to the group-source pairing comprises reviewing a group table maintained by the first wireless node.

26. The method of claim 25, wherein the group table includes a list of group-source pairings which the first wireless node supports, and for each group-source pairing, the group table includes data identifying the function of the first wireless node with respect to the group-source pairing, a list of upstream nodes, and a list of downstream nodes.

27. The method of claim 22, wherein the forwarding the multicast packet to a second node comprises forwarding the multicast packet according to a multipoint relaying protocol.

* * * * *